United States Patent
Tignor et al.

(10) Patent No.: US 7,301,742 B2
(45) Date of Patent: *Nov. 27, 2007

(54) METHOD AND APPARATUS FOR ACCESSING AND ACTIVATING ACCESSORY FUNCTIONS OF ELECTRONIC CIRCUIT BREAKERS

(75) Inventors: Michael S. Tignor, Watertown, CT (US); Michael B. Bradley, Farmington, CT (US); LeeAnne Wambolt, Plainville, CT (US); Geoffrey F. Butland, Farmington, CT (US); Michael H. Thomas, Amersfoort (NL); Paul Rajotte, Plainville, CT (US)

(73) Assignee: General Electric Company, Schenectady, NY (US)

( * ) Notice: Subject to any disclaimer, the term of this patent is extended or adjusted under 35 U.S.C. 154(b) by 637 days.

This patent is subject to a terminal disclaimer.

(21) Appl. No.: 10/682,225

(22) Filed: Oct. 8, 2003

(65) Prior Publication Data

US 2004/0066595 A1    Apr. 8, 2004

Related U.S. Application Data

(63) Continuation-in-part of application No. 09/682,512, filed on Sep. 12, 2001, now Pat. No. 6,678,135.

(51) Int. Cl.
*H02H 7/00* (2006.01)
(52) U.S. Cl. ................................. 361/93.3
(58) Field of Classification Search ................. 361/93.3
See application file for complete search history.

(56) References Cited

U.S. PATENT DOCUMENTS

| | | | |
|---|---|---|---|
| 2,340,682 A | 2/1944 | Powell | 200/147 |
| 2,719,203 A | 9/1955 | Gelzheiser et al. | 200/144 |
| 2,937,254 A | 5/1960 | Ericson | 200/114 |
| 3,158,717 A | 11/1964 | Jencks et al. | 200/116 |
| 3,162,739 A | 12/1964 | Klein et al. | 200/88 |
| 3,197,582 A | 7/1965 | Norden | 200/50 |
| 3,307,002 A | 2/1967 | Cooper | 200/116 |
| 3,517,356 A | 6/1970 | Hanafusa | 335/16 |
| 3,631,369 A | 12/1971 | Menocal | 337/110 |
| 3,803,455 A | 4/1974 | Willard | 317/33 SC |
| 3,883,781 A | 5/1975 | Cotton | 317/14 R |
| 4,129,762 A | 12/1978 | Bruchet | 200/153 G |
| 4,144,513 A | 3/1979 | Shafer et al. | 335/46 |
| 4,158,119 A | 6/1979 | Krakik | 200/240 |

(Continued)

FOREIGN PATENT DOCUMENTS

BE    819 008 A    12/1974

(Continued)

*Primary Examiner*—Stephen W. Jackson
(74) *Attorney, Agent, or Firm*—Cantor & Colburn LLP (57) ABSTRACT

An electronic trip unit for a circuit breaker includes a programmed microprocessor and a module plug in removable signal communication with the microprocessor. The module plug includes a program identifier. The microprocessor recognizes the program identifier and accesses a program of a plurality of programs external to the module plug based on the program identifier. The microprocessor responds to the program to perform a function identified by the module plug. The function identifiable by the module plug includes a communications function, a load monitoring function, a non-tripping ground fault alarm function, a flag function, or any combination thereof.

20 Claims, 7 Drawing Sheets

U.S. PATENT DOCUMENTS

| | | |
|---|---|---|
| 4,165,453 A | 8/1979 | Hennemann ............ 200/153 G |
| 4,166,988 A | 9/1979 | Ciarcia et al. ................. 335/9 |
| 4,220,934 A | 9/1980 | Wafer et al. ................... 335/16 |
| 4,255,732 A | 3/1981 | Wafer et al. ................... 335/16 |
| 4,259,651 A | 3/1981 | Yamat ........................... 335/16 |
| 4,263,492 A | 4/1981 | Maier et al. ................. 200/288 |
| 4,276,527 A | 6/1981 | Gerbert-Gaillard et al. ... 335/39 |
| 4,297,663 A | 10/1981 | Seymour et al. ............... 335/20 |
| 4,301,342 A | 11/1981 | Castonguay et al. .. 200/153 SC |
| 4,360,852 A | 11/1982 | Gilmore ........................ 361/98 |
| 4,368,444 A | 1/1983 | Preuss et al. ................ 335/166 |
| 4,375,021 A | 2/1983 | Pardini et al. .......... 200/147 B |
| 4,375,022 A | 2/1983 | Daussin et al. .......... 200/148 B |
| 4,376,270 A | 3/1983 | Staffen ........................ 335/21 |
| 4,383,146 A | 5/1983 | Bur ........................... 200/17 R |
| 4,392,036 A | 7/1983 | Trobel et al. ............... 200/322 |
| 4,393,283 A | 7/1983 | Masuda ................... 200/51.09 |
| 4,401,872 A | 8/1983 | Boichot-Castagne et al. ....................... 200/153 G |
| 4,409,573 A | 10/1983 | DiMarco et al. .............. 335/16 |
| 4,435,690 A | 3/1984 | Link et al. .................... 335/37 |
| 4,467,297 A | 8/1984 | Boichot-Castagne et al. ... 335/8 |
| 4,468,645 A | 8/1984 | Gerbert-Gaillard et al. ... 335/42 |
| 4,470,027 A | 9/1984 | Link et al. .................... 335/16 |
| 4,479,143 A | 10/1984 | Watanabe et al. ............. 358/44 |
| 4,488,133 A | 12/1984 | McClellan et al. ........... 335/16 |
| 4,492,941 A | 1/1985 | Nagel ........................... 335/13 |
| 4,541,032 A | 9/1985 | Schwab ....................... 361/331 |
| 4,546,224 A | 10/1985 | Mostosi ................. 200/153 G |
| 4,550,360 A | 10/1985 | Dougherty ................... 361/93 |
| 4,562,419 A | 12/1985 | Preuss et al. ................ 335/195 |
| 4,589,052 A | 5/1986 | Dougherty ................... 361/94 |
| 4,595,812 A | 6/1986 | Tamaru et al. .............. 200/307 |
| 4,611,187 A | 9/1986 | Banfi ........................ 335/16 |
| 4,612,430 A | 9/1986 | Sloan et al. ................. 200/327 |
| 4,616,198 A | 10/1986 | Pardini ........................ 335/16 |
| 4,622,444 A | 11/1986 | Kandatsu et al. ........... 200/303 |
| 4,631,625 A | 12/1986 | Alexander et al. ............. 361/94 |
| 4,642,431 A | 2/1987 | Tedesco et al. ......... 200/153 G |
| 4,644,438 A | 2/1987 | Puccinelli et al. ............. 361/75 |
| 4,649,247 A | 3/1987 | Preuss et al. ................ 200/244 |
| 4,658,322 A | 4/1987 | Rivera .......................... 361/37 |
| 4,672,501 A | 6/1987 | Bilac et al. .................. 361/96 |
| 4,675,481 A | 6/1987 | Markowski et al. ..... 200/144 R |
| 4,682,264 A | 7/1987 | Demeyer ..................... 361/96 |
| 4,689,712 A | 8/1987 | Demeyer ..................... 361/96 |
| 4,694,373 A | 9/1987 | Demeyer ..................... 361/96 |
| 4,710,845 A | 12/1987 | Demeyer ..................... 361/96 |
| 4,717,985 A | 1/1988 | Demeyer ..................... 361/96 |
| 4,733,211 A | 3/1988 | Castonguay et al. ........ 335/192 |
| 4,733,321 A | 3/1988 | Lindeperg .................... 361/96 |
| 4,764,650 A | 8/1988 | Bur et al. ............... 200/153 G |
| 4,768,007 A | 8/1988 | Mertz et al. ................. 335/202 |
| 4,780,786 A | 10/1988 | Weynachter et al. .......... 361/87 |
| 4,831,221 A | 5/1989 | Yu et al. .................... 200/553 |
| 4,833,563 A | 5/1989 | Russell ........................ 361/92 |
| 4,870,531 A | 9/1989 | Danek ........................ 361/93 |
| 4,883,931 A | 11/1989 | Batteux et al. .......... 200/148 R |
| 4,884,047 A | 11/1989 | Baginski et al. ............... 335/10 |
| 4,884,164 A | 11/1989 | Dziura et al. ................. 361/97 |
| 4,900,882 A | 2/1990 | Bernard et al. .......... 200/147 R |
| 4,910,485 A | 3/1990 | Bolongeat-Mobleu et al. ........................... 335/195 |
| 4,914,541 A | 4/1990 | Tripodi et al. ................. 361/94 |
| 4,916,420 A | 4/1990 | Bartolo et al. ............... 335/172 |
| 4,916,421 A | 4/1990 | Pardini et al. ............... 335/185 |
| 4,926,282 A | 5/1990 | McGhie ...................... 361/102 |
| 4,935,590 A | 6/1990 | Malkin et al. .......... 200/148 A |
| 4,937,706 A | 6/1990 | Schueller et al. ........... 361/396 |
| 4,939,492 A | 7/1990 | Raso et al. ................... 335/42 |
| 4,943,691 A | 7/1990 | Mertz et al. ................. 200/151 |
| 4,943,888 A | 7/1990 | Jacob et al. ................... 361/96 |
| 4,950,855 A | 8/1990 | Bolongeat-Mobleu et al. ......................... 200/148 A |
| 4,951,019 A | 8/1990 | Gula ........................ 335/166 |
| 4,952,897 A | 8/1990 | Barnel et al. ................ 335/147 |
| 4,958,135 A | 9/1990 | Baginski et al. ............... 335/8 |
| 4,965,543 A | 10/1990 | Batteux ...................... 335/174 |
| 4,983,788 A | 1/1991 | Pardini ..................... 200/16 R |
| 5,001,313 A | 3/1991 | Leclerq et al. .......... 200/148 B |
| 5,004,878 A | 4/1991 | Seymour et al. ......... 200/144 R |
| 5,029,301 A | 7/1991 | Nebon et al. ................. 335/16 |
| 5,030,804 A | 7/1991 | Abri ........................... 200/323 |
| 5,057,655 A | 10/1991 | Kersusan et al. ........ 200/148 B |
| 5,077,627 A | 12/1991 | Fraisse ........................ 361/93 |
| 5,083,081 A | 1/1992 | Barrault et al. ............. 324/126 |
| 5,095,183 A | 3/1992 | Raphard et al. ........ 200/148 A |
| 5,103,198 A | 4/1992 | Morel et al. .................... 335/6 |
| 5,115,371 A | 5/1992 | Tripodi ...................... 361/106 |
| 5,120,921 A | 6/1992 | DiMarco et al. ........... 200/401 |
| 5,132,865 A | 7/1992 | Mertz et al. ................... 361/6 |
| 5,138,121 A | 8/1992 | Streich et al. ............... 200/293 |
| 5,140,115 A | 8/1992 | Morris ........................ 200/308 |
| 5,153,802 A | 10/1992 | Mertz et al. ................... 361/18 |
| 5,155,315 A | 10/1992 | Malkin et al. ........... 200/148 R |
| 5,166,483 A | 11/1992 | Kersusan et al. ........ 200/144 A |
| 5,172,087 A | 12/1992 | Castonguay et al. ........ 335/160 |
| 5,178,504 A | 1/1993 | Faichi ........................ 411/553 |
| 5,184,717 A | 2/1993 | Chou et al. ................ 200/401 |
| 5,187,339 A | 2/1993 | Lissandrin .............. 200/148 F |
| 5,198,956 A | 3/1993 | Dvorak ....................... 361/106 |
| 5,200,724 A | 4/1993 | Gula et al. .................. 335/166 |
| 5,210,385 A | 5/1993 | Morel et al. ............. 200/146 R |
| 5,239,150 A | 8/1993 | Bolongent-Mobleu et al. ....................... 200/148 R |
| 5,260,533 A | 11/1993 | Livesey et al. .............. 200/401 |
| 5,262,744 A | 11/1993 | Arnold et al. .................. 335/8 |
| 5,280,144 A | 1/1994 | Bolongent-Mobleu et al. ....................... 200/148 R |
| 5,281,776 A | 1/1994 | Morel et al. ................ 200/144 |
| 5,296,660 A | 3/1994 | Morel et al. ............. 200/146 R |
| 5,296,664 A | 3/1994 | Crookston et al. .......... 200/401 |
| 5,298,874 A | 3/1994 | Morel et al. .................... 335/8 |
| 5,300,907 A | 4/1994 | Nereau et al. ............... 335/172 |
| 5,310,971 A | 5/1994 | Vial et al. ................... 200/244 |
| 5,313,180 A | 5/1994 | Vial et al. .................... 335/16 |
| 5,317,471 A | 5/1994 | Izoard et al. ................ 361/105 |
| 5,331,500 A | 7/1994 | Corcoles et al. .............. 361/93 |
| 5,334,808 A | 8/1994 | Bur et al. ..................... 200/50 |
| 5,341,191 A | 8/1994 | Crookston et al. ........... 335/16 |
| 5,347,096 A | 9/1994 | Bolongent-Mobleu et al. ....................... 200/148 B |
| 5,347,097 A | 9/1994 | Bolongent-Mobleu et al. ....................... 200/148 B |
| 5,350,892 A | 9/1994 | Rozier ..................... 200/144 B |
| 5,357,066 A | 10/1994 | Morel et al. ............... 200/17 R |
| 5,357,068 A | 10/1994 | Rozier ..................... 200/148 R |
| 5,357,394 A | 10/1994 | Piney ........................... 361/72 |
| 5,361,052 A | 11/1994 | Ferello et al. ............... 335/172 |
| 5,373,130 A | 12/1994 | Barrault et al. .......... 200/147 R |
| 5,379,013 A | 1/1995 | Coudert ....................... 335/17 |
| 5,424,701 A | 6/1995 | Castonguay et al. ........ 335/172 |
| 5,426,592 A | 6/1995 | Leone et al. ................ 364/492 |
| 5,438,176 A | 8/1995 | Bonnardel et al. .......... 200/400 |
| 5,440,088 A | 8/1995 | Coudert et al. ............. 200/303 |
| 5,449,871 A | 9/1995 | Batteux et al. ............. 200/401 |
| 5,450,048 A | 9/1995 | Leger et al. ................ 335/132 |
| 5,451,729 A | 9/1995 | Onderka et al. ............. 200/18 |
| 5,457,295 A | 10/1995 | Tanibe et al. ............... 200/293 |
| 5,467,069 A | 11/1995 | Payet-Burin et al. ......... 335/42 |
| 5,469,121 A | 11/1995 | Payet-Burin ................. 335/16 |
| 5,475,558 A | 12/1995 | Barjonnet et al. ............ 361/64 |
| 5,477,016 A | 12/1995 | Baginski et al. ......... 200/43.11 |
| 5,479,143 A | 12/1995 | Payet-Burin ................ 335/202 |

| | | | | | | |
|---|---|---|---|---|---|---|
| 5,483,212 | A | 1/1996 | Lankuttis et al. ............ 335/132 | EP | 0 258 090 | 3/1988 |
| 5,485,343 | A | 1/1996 | Santos et al. ................ 361/115 | EP | 0 264 313 | 4/1988 |
| D367,265 | S | 2/1996 | Yamagata et al. .......... D13/160 | EP | 0 264 314 | 4/1988 |
| 5,490,086 | A | 2/1996 | Leone et al. ................. 364/492 | EP | 0 283 189 | 9/1988 |
| 5,493,083 | A | 2/1996 | Olivier ....................... 220/17 R | EP | 0 283 358 | 9/1988 |
| 5,504,284 | A | 4/1996 | Lazareth et al. ........... 200/50 R | EP | 0 291 374 | 11/1988 |
| 5,504,290 | A | 4/1996 | Baginski et al. ............. 200/401 | EP | 0 295 155 | 12/1988 |
| 5,510,761 | A | 4/1996 | Boder et al. ................. 335/172 | EP | 0 295 158 | 12/1988 |
| 5,512,720 | A | 4/1996 | Coudert et al. .............. 200/400 | EP | 0 309 923 | 4/1989 |
| 5,515,018 | A | 5/1996 | DiMarco et al. ............... 335/16 | EP | 0 313 106 | 4/1989 |
| 5,519,561 | A | 5/1996 | Mrenna et al. .............. 361/105 | EP | 0 313 422 | 4/1989 |
| 5,534,674 | A | 7/1996 | Steffens ....................... 218/154 | EP | 0 314 540 | 5/1989 |
| 5,534,832 | A | 7/1996 | Duchemin et al. ............ 335/16 | EP | 0 331 586 | 9/1989 |
| 5,534,835 | A | 7/1996 | McColloch et al. ........ 335/172 | EP | 0 337 900 | 10/1989 |
| 5,534,840 | A | 7/1996 | Cuingnet ........................ 337/1 | EP | 0 342 133 | 11/1989 |
| 5,539,168 | A | 7/1996 | Linzenich ................... 200/303 | EP | 0 367 690 | 5/1990 |
| 5,543,595 | A | 8/1996 | Mader et al. ................. 200/401 | EP | 0 371 887 | 6/1990 |
| 5,552,755 | A | 9/1996 | Fello et al. .................... 335/18 | EP | 0 375 568 | 6/1990 |
| 5,581,219 | A | 12/1996 | Nozawa et al. ............. 335/132 | EP | 0 394 144 | 10/1990 |
| 5,604,656 | A | 2/1997 | Derrick et al. .............. 361/187 | EP | 0 394 922 | 10/1990 |
| 5,608,367 | A | 3/1997 | Zoller et al. ................ 335/132 | EP | 0 399 282 | 11/1990 |
| 5,784,233 | A | 7/1998 | Bastard et al. ................ 361/36 | EP | 0 407 310 | 1/1991 |
| 6,169,651 | B1 | 1/2001 | Dias ............................ 361/206 | EP | 0 452 230 | 10/1991 |
| 6,217,370 | B1 | 4/2001 | Scheel et al. ................ 439/483 | EP | 0 555 158 | 8/1993 |
| 6,252,365 | B1 | 6/2001 | Morris et al. ................ 318/455 | EP | 0 560 697 | 9/1993 |
| 6,678,135 | B2 * | 1/2004 | Tignor et al. ............... 361/93.3 | EP | 0 567 416 | 10/1993 |
| 6,804,101 | B2 * | 10/2004 | Tignor et al. ............... 361/93.3 | EP | 0 595 730 | 5/1994 |
| 6,836,396 | B1 * | 12/2004 | Tignor et al. ............... 361/93.3 | EP | 0 619 591 | 10/1994 |
| | | | | EP | 0 665 569 | 8/1995 |
| | | FOREIGN PATENT DOCUMENTS | | EP | 0 700 140 | 3/1996 |
| DE | | 12 27 978 | 11/1966 | EP | 0 889 498 | 1/1999 |
| DE | | 30 47 360 | 6/1982 | EP | 1 294 068 A3 | 3/2006 |
| DE | | 38 02 184 | 8/1989 | FR | 2 410 353 | 6/1979 |
| DE | | 38 43 277 | 6/1990 | FR | 2 512 582 | 3/1983 |
| DE | | 44 19 240 | 1/1995 | FR | 2 553 943 | 4/1985 |
| EP | | 0 061 092 | 9/1982 | FR | 2 592 998 | 7/1987 |
| EP | | 0 064 906 | 11/1982 | FR | 2 697 670 | 5/1994 |
| EP | | 0 066 486 | 12/1982 | FR | 2 682 531 | 4/1996 |
| EP | | 0 117 094 | 8/1984 | FR | 2 699 324 | 6/1997 |
| EP | | 0 140 761 | 5/1985 | FR | 2 714 771 | 7/1998 |
| EP | | 0 174 904 | 3/1986 | GB | 2 233 155 | 1/1991 |
| EP | | 0 076 719 | 4/1986 | WO | 92/00598 | 1/1992 |
| EP | | 0 196 241 | 10/1986 | WO | 92/05649 | 4/1992 |
| EP | | 0 224 396 | 6/1987 | WO | 94/00901 | 1/1994 |
| EP | | 0 235 479 | 9/1987 | | | |
| EP | | 0 239 460 | 9/1987 | * cited by examiner | | |

GF: Ground fault
GFA: Ground fault alarm
LS: Load shedding
COM: Communication

METHOD AND APPARATUS FOR ACCESSING AND ACTIVATING ACCESSORY FUNCTIONS OF ELECTRONIC CIRCUIT BREAKERS

CROSS-REFERENCE TO RELATED APPLICATIONS

This application is a continuation-in-part application of U.S. application Ser. No. 09/682,512 filed Sep. 12, 2001, now U.S. Pat. No. 6,678,135, which is hereby incorporated by reference in its entirety.

BACKGROUND OF THE INVENTION

Electronic trip units (trip units) for actuating the separable contacts in a circuit breaker are well known. An electronic trip unit typically comprises voltage and current sensors that provide analog signals indicative of current or voltage in a power distribution circuit. The analog signals are converted by an A/D (analog/digital) converter to digital signals that are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality trip setting values, including initializing parameters, boot code, and operational parameters (e.g., trip setting instructions). Operational parameters for the application code are also stored in the EEPROM. An output of the electronic trip unit actuates a trip module, such as a solenoid, that trips a mechanical operating mechanism. The mechanical operating mechanism, in turn, separates a pair of main contacts within the circuit breaker. When the contacts open, circuit current is prevented from flowing from one contact to the other, and electrical current is prevented from flowing to a load that is connected to the breaker. The electronic trip unit initiates a trip for instantaneous, short time, long time, ground fault, and manual conditions.

Circuit breakers having electronic trip units are described in U.S. Pat. No. 4,672,501 entitled "Circuit Breaker and Protective Relay Unit". Such trip units often include a specific interface for a specific plug in module. One such example of a specific interface is a keypad along with a display for accessing the processor and for entering and changing the trip unit settings as described within U.S. Pat. No. 4,870,531 entitled "Circuit Breaker With Removable Display & Keypad". Other functional modules cannot be plugged into the place where this specific plug is received within the electronic trip unit. Thus, in order for the operator to receive additional functions for the trip unit, the operator would have to order the additional functions prior to the electronic trip unit being shipped to the operator. The operator could not install these additional functions in the field. Accordingly, it is desirable to have an advanced electronic trip unit that overcomes the drawbacks and deficiencies of the prior art.

SUMMARY OF THE INVENTION

In an embodiment, an electronic trip unit for a circuit breaker includes a programmed microprocessor and a module plug in removable signal communication with the microprocessor. The module plug includes a program identifier. The microprocessor recognizes the program identifier and accesses a program of a plurality of programs external to the module plug based on the program identifier. The microprocessor responds to the program to perform a function identified by the module plug. The function identifiable by the module plug includes a communications function, a load monitoring function, a non-tripping ground fault alarm function, a flag function, or any combination thereof.

In another embodiment, a method for accessing and activating an accessory function of an electronic circuit breaker is disclosed. A key is entered into an electronic circuit breaker, which reads the key and compares the key against a predefined key set. In response thereto, access is unlocked to a preprogrammed set of instructions for driving an accessory function, and the preprogrammed set of instructions to drive the accessory function is activated.

In a further embodiment, an apparatus includes a trip unit in removable signal communication with a module and a plurality of computer programs each when activated providing predetermined functionality to the trip unit. The trip unit is configured to receive from the module a program identifier associated with a plurality of programs. Receipt of the program identifier by the trip unit initiates the activation of the associated program, thereby providing predetermined functionality to the trip unit.

BRIEF DESCRIPTION OF THE DRAWINGS

Referring to the exemplary drawings wherein like elements are numbered alike in the several Figures.

DETAILED DESCRIPTION OF THE INVENTION

Figure 1:
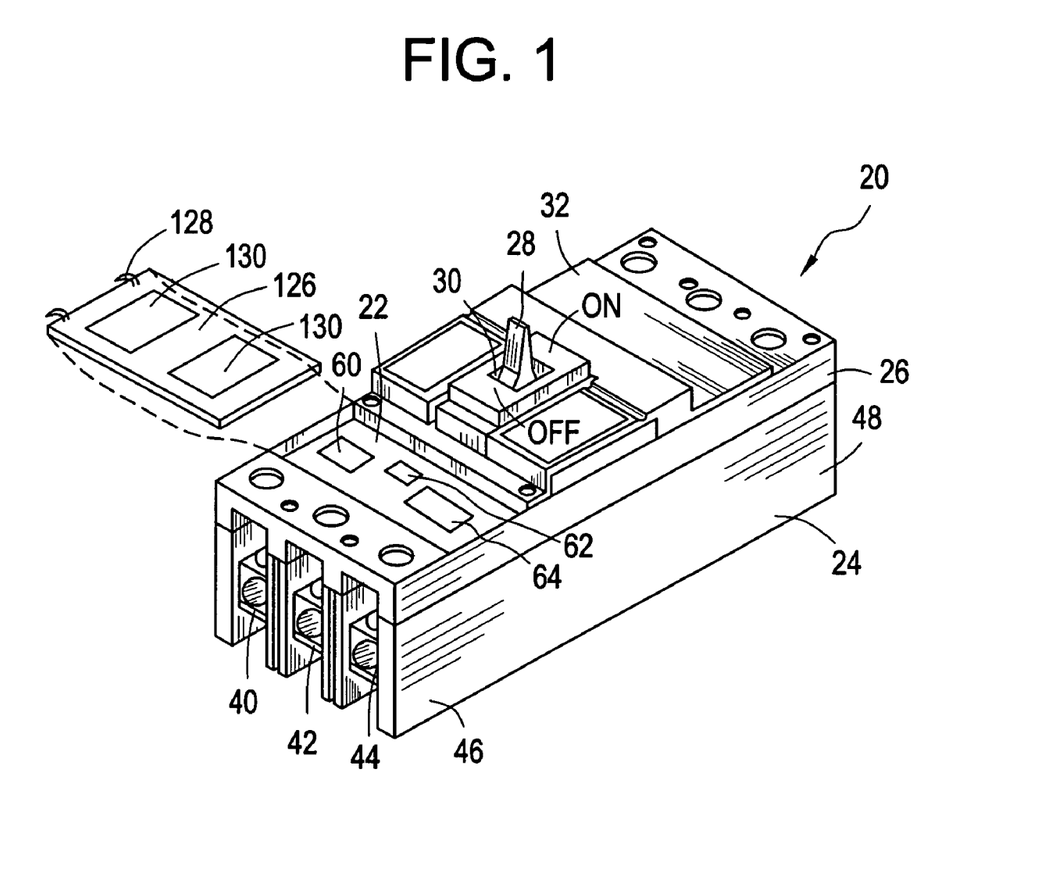
FIG. 1 is a perspective view of a circuit breaker including an electronic trip unit with a module plug.

Referring to FIG. 1, a molded case circuit breaker 20 employing an electronic trip unit 22 is generally shown. Circuit breakers of this type have an insulated case 24 and a mid-cover 26 that house the components of circuit breaker 20. A handle 28 extending through an aperture 30 of a cover 32 gives the operator the ability to turn circuit breaker 20 "on", which allows electricity to flow through circuit breaker 20, turn circuit breaker 20 "off", which prevents electricity from flowing through circuit breaker 20, or "reset" circuit breaker 20 after a fault. A plurality of electrically conducting load side contact straps (load straps) 40, 42, and 44 at a load side 46 of circuit breaker 20 extend within case 24. Line side contact straps 50, 52, 54 (shown on FIG. 3) are located on a line side 48 of circuit breaker and also extend within case 24. Circuit breaker 20 illustrates a typical three-phase configuration, however, the present disclosure is not limited to this configuration but may be applied to other configurations, such as one, two or four phase circuit breakers. Removably disposed at electronic trip unit 22 is a module plug 60, as will be described in further detail hereinafter. Electronic trip unit 22 also includes a cover 126 that has transparent windows 130 that enables the operator to view module plug 60 without removing cover 126. Module plug 60 is flush with the face of electronic trip unit 22 so that cover 126 can be closed with module plug 60 in place in electronic trip unit 22. Preferably, cover 126 has hinges 128 so that cover can be swung open and the operator may easily access module plug 60. Cover 126 may also be locked to prevent tampering by unauthorized personnel.

Figure 2:
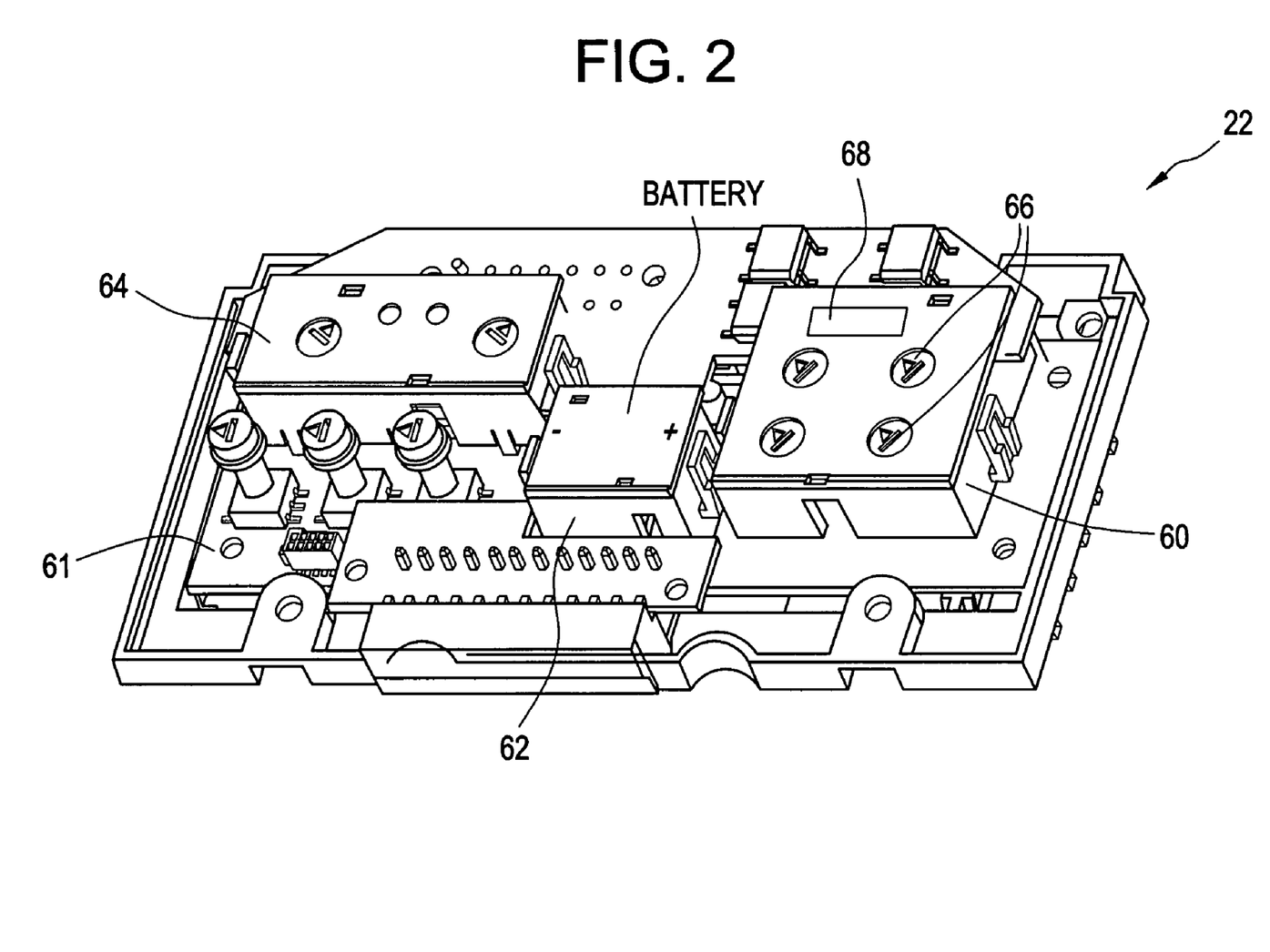
FIG. 2 is the electronic trip unit with the module plug of FIG. 1.

FIG. 2 illustrates electronic trip unit 22 removed from circuit breaker 20. Electronic trip unit 22 includes a printed circuit board 61 to which a plug-in battery 62, a plug-in rating plug 64, and module plug 60 are removably mounted. Rating plug 64 allows the circuit interruption rating to be set by replacing rating plug 64 with a different rating plug. For instance, rating plug 64 may be used to set circuit breaker at 800 amperes maximum current. Rating plug 64 may be subsequently changed to set the maximum rating to 1200 amperes. Battery 62 supplies either a primary source or an alternative source of power to electronic trip unit 22.

Module plug 60 is a small electronic assembly, which may be approximately one inch square and approximately about one-half inch deep. Module plug 60 provides for an operator interface in the form of dials 66, push buttons (not shown), rotary switches (not shown), and the like. Module plug 60 may also include an LCD or LED display 68 that provides the operator with information regarding circuit breaker 20 (shown in FIG. 1) (e.g., whether the circuit breaker is on, off, or tripped), or electronic trip unit 22 (e.g., the trip setting), or the power distribution circuit to which circuit breaker 20 (shown in FIG. 1) is connected (e.g., voltage, power, or current). Module plug 60, battery 62, and rating plug 64 each include a means for removably connecting to printed circuit board 61. Such means includes a pin connector 69 (shown on FIG. 3), an input/output port (not shown), or the like.

Figure 3:
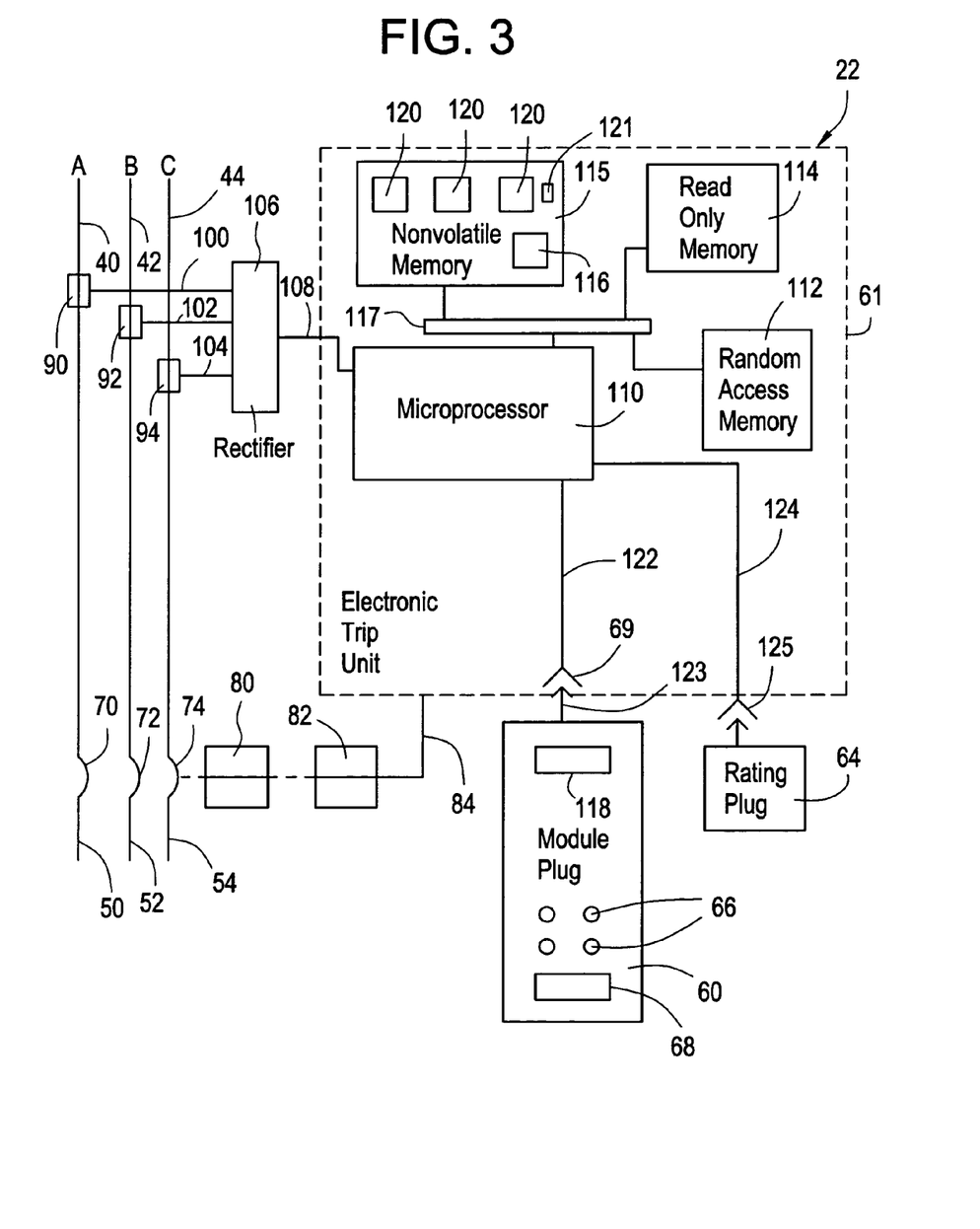
FIG. 3 is a schematic block diagram of the electronic trip unit with the module plug of FIG. 2 in the circuit breaker of FIG. 1.

Referring to FIG. 3, a general schematic of a portion of circuit breaker 20 is shown. In circuit breaker 20, load straps 40, 42, and 44 are electrically connected to line straps 50, 52, and 54 via electrical contacts 70, 72, 74. Electrical contacts 70, 72, and 74 are arranged so that each electrical contact 70, 72, and 74 can be separated to stop the flow of electrical current from line straps 50, 52, and 54 to load straps 40, 42, and 44. Electrical contacts 70, 72, and 74 are mechanically connected to an operating mechanism 80, which is a spring-loaded latching mechanism for separating contacts 70, 72, and 74. A trip actuator 82 is positioned to trip (unlatch) operating mechanism 80 in response to receiving an electrical trip signal from electronic trip unit 22 via line 84. When operating mechanism 80 is tripped by trip actuator 82, operating mechanism 80 separates each electrical contact 70, 72, and 74 to stop the flow of electrical current from line straps 50, 52, and 54 to load straps 40, 42, and 44. Line straps 50, 52, 54, load straps 40, 42, 44, and electrical contacts 70, 72, 74, are collectively referred to as separable electrical paths, one path being arranged in each phase of circuit breaker 20.

Load straps 40, 42, and 44 are configured for electrical connection to a three-phase power source exemplified by phases A, B, and C. Load straps 40, 42, and 44 are coupled to current transformers 90, 92, 94, respectively, which are then connected by lines 100, 102, and 104 to a rectifier 106. Rectifier 106 is electrically connected by line 108 to a microprocessor 110 mounted to printed circuit board 61 of electronic trip unit 22.

Electronic trip unit 22 includes microprocessor 110, a random access memory (RAM) 112, a read only memory (ROM) 114, and a nonvolatile memory 115. RAM 112 is coupled with microprocessor via a bus 117 and is used for the temporary storage of current and voltage data and as a scratch pad memory. ROM 115 is coupled with microprocessor via bus 117 and contains boot code data. Nonvolatile memory 115 is also coupled with microprocessor via bus 117 and stores a control program 116 that instructs microprocessor 110 to perform certain functions such as overcurrent protection, metering, protective relaying and communications. Nonvolatile memory 115 also stores a plurality of programs, or instructions, 120 that implement module plug 60 functions and a look-up table 121 that maps each program 120 with a corresponding module plug identification number. Microprocessor 110 controls RAM 112, ROM 114, nonvolatile memory 115, and bus 117.

Electronic trip unit 22 is coupled with module plug 60 by pin connector 69. Pin connector 69 is coupled with microprocessor 110 by a lead 122. Module plug 60 includes an identification register 118, dials 66, and display 68, all of which are coupled with pin connector 69 via lead 123. Stored in identification register 118 is a binary representation of the module plug identification number unique to the type of module plug 60. Rating plug 64 is also coupled with microprocessor 110 by a lead 124 and a pin connector 125.

Figure 4:
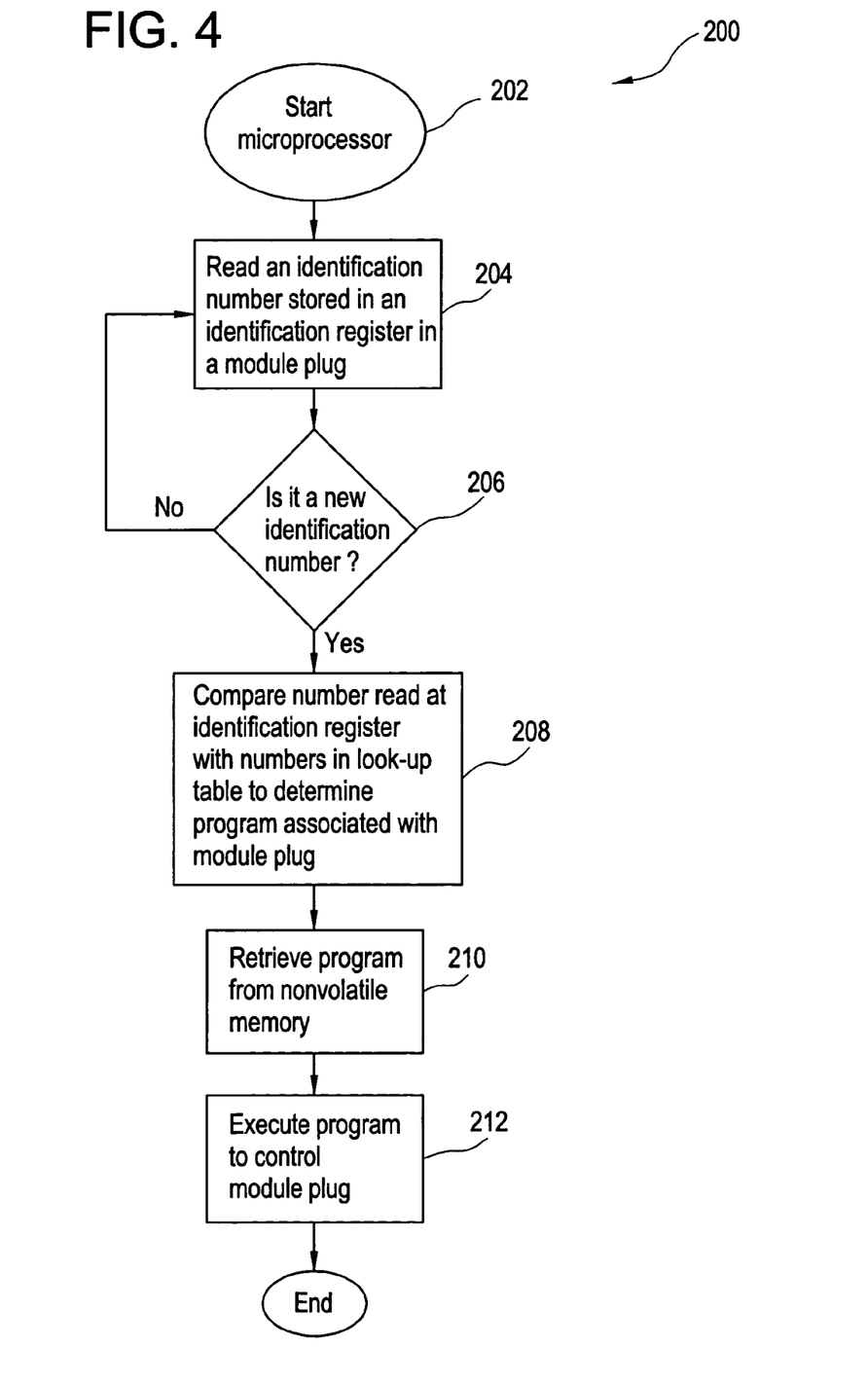
FIG. 4 is a flow chart providing an operation of the module plug and the electronic trip unit of FIG. 2.

Referring to FIGS. 3 and 4, module plug 60 and electronic trip unit 22 function as follows. Control program 116 instructs microprocessor 110 to perform a process 200, which is started when microprocessor 110 is first booted up (block 202). An operator (not shown) plugs module plug 60 into pin connector 69, which couples module plug 60 with microprocessor 110. Control program 116 instructs microprocessor 110 to periodically read identification register 118 located at module plug 60 (block 204). Control program 116 determines whether a new identification number is present (block 206). If a new identification number is not present, control program 116 instructs microprocessor 110 to read identification register 118 (block 204). If a new identification number is present, then control program 116 instructs microprocessor 110 to compare the identification number read from identification register 118 with the identification numbers listed in look-up table 121 and determine the program 120 associated with the identification number (block 208). Control program 116 then instructs microprocessor to retrieve and execute the associated program 120 (block 210).

Depending on which program 120 is accessed, program 120 will instruct microprocessor 110 to perform steps necessary to operate functions of module plug 60 (block 212). Such functions include accepting input from module plug 60, such as reading input values from dials 66, and providing output data to module plug 60, such as providing signals to display 68. Some examples of the functions module plug 60 can perform include displaying the current being measured by electronic trip unit 22, changing the trip parameters stored in remote access memory 112, displaying overload pick-up times, displaying instantaneous tripping values and energy values, and the like. When a specific module plug 60 is not desired, a blank module plug should be connected to electronic trip unit 22 to protect electronic trip unit 22. In addition, microprocessor 110 reads the number associated with the blank module and determines that no additional function is required.

Module plug 60 and electronic trip unit 22 provide the operator with a flexible electronic trip unit. The operator will be able to upgrade the electronic trip unit after purchasing the electronic trip unit. The operator will also be able to change the capability of the electronic trip unit easily by changing the module plug in the electronic trip unit. Thus, additional options and functions can be installed by the operator in the field.

In an exemplary embodiment, microprocessor 110 is in operable communication with circuit breaker 20, receiving informative signals from current transformers 90, 92, 94 and sending control signals to trip actuator 82. Nonvolatile memory 115 includes a plurality of preprogrammed instructions 120 that are programmed into nonvolatile memory 115 at the point of manufacture of electronic trip unit 22. The preprogrammed instructions 120 provide accessory functions that may be accessed and activated after a customer has purchased electronic trip unit 22 by the customer purchasing an appropriately programmed module plug 60, which is releasably engaged with electronic trip unit 22. Module plug 60 includes identification register 118 that contains an identification number that correlates with a designated preprogrammed instruction set 120 in nonvolatile memory 115. Lookup table 121 includes a listing of preprogrammed identification numbers that correlate the identification number in identification register 118 with the appropriate preprogrammed instruction set 120. Exemplary preprogrammed instructions 120 include, an ammeter display function, a ground fault function, an external communication function, a load monitoring function, a trip target flag, a load monitoring flag, a ground fault flag, a communications flag, and a blank function. Microprocessor 110 is programmed to read the identification number in identification register 118, and if a new identification number is encountered, to retrieve and read the preprogrammed instructions that correlate to the new identification number. Upon reading the appropriate instructions, microprocessor 110 performs the steps necessary to operate the functions correlating to the identification number of module plug 60. If no new identification number is encountered, microprocessor 110 performs the steps previously read in.

As discussed above, an embodiment includes several preprogrammed instructions 120 at nonvolatile memory 115 that are accessible by a module plug 60 having a preprogrammed registration number. In an embodiment, the several preprogrammed instructions 120 are grouped according to function. A display module plug 60 is preprogrammed to access and activate preprogrammed instructions 120 to provide an ammeter display function.

A quad module plug 60 is preprogrammed to access and activate preprogrammed instructions 120 to provide a ground fault function, an external communication function, and a load monitoring function. The ground fault function may be either a ground fault trip function, where circuit breaker 20 is instructed to trip on a ground fault condition, or a ground fault alarm function, where display 68 provides a visual alarm of a ground fault condition. The external communications function is provided by enabling a MOD-BUS communications port (not shown) on electronic trip unit 22. The load monitoring function enables the user to view on display 68 when the highest of the three-phase currents has exceeded a predefined load threshold, the thresholds being settable through dials 66. Dials 66 and display 68 provide an operator interface to module plug 60.

A flag module plug 60 is preprogrammed to access and activate preprogrammed instructions 120 to provide a trip target flag, a load monitoring flag, a ground fault flag, and a communications flag. The trip target flag enables the user to view on display 68 which trip target (source of trip activation, such as long-time (LT), short-time (ST), or instantaneous (Inst), for example) caused circuit breaker 20 to trip. The load monitoring flag enables the user to view on display 68 which phase has exceeded the predefined load threshold, and what the threshold setting is. The ground fault flag enables the user to view on display 68 whether a ground fault condition exists or not. The communications flag enables the user to veiw on display 68 when a communication action is occuring with electronic trip unit 22.

A blank module plug 60 is preprogrammed to prevent access and activation of any of the preprogrammed instructions 120 in nonvolatile memory 115.

As discussed above with reference to FIGS. 3 and 4, control program 116 instructs microprocessor 110 to perform process 220, which is started when microprocessor 110 is first booted up 202. With the insertion of a new module plug 60, microprocessor 110, under the control of control program 116, identifies module plug 60 by reading the identification number at identification register 118, compares this identification number with a plurality of preprogrammed numbers at look-up table 121 in nonvolatile memory 115, determines from this comparison which of the preprogrammed instructions 120 correlate to the module plug identification number, retrieves and reads those instructions 120, and then executes the associated instructions 120 to control either circuit breaker 20, causing a trip action for example, electronic trip unit 22, setting load monitoring thresholds for example, or module plug 60, providing user displays for example.

From the foregoing, it will be appreciated that module plug 60 does not contain any preprogrammed instructions 120, containing instead only an identification number in identification register 118 that correlates, via lookup table 121, with a set of preprogrammed instructions 120 in nonvolatile memory 115 at electronic trip unit 22. All of the available accessory functions are preprogrammed, referred to as option dispensed in the industry, in electronic trip unit 22 at the time of manufacture, but are locked from access by control program 116. To access and activate any one of the accessory functions, or preprogrammed instructions 120, control program must recognize module plug 60 as being an authorized module plug and a match must be made between the identification number in module plug 60 with the list of identification numbers in lookup table 121. In this manner, module plug 60 acts as the key that unlocks the desired accessory function, or preprogrammed instruction 120, with lookup table 121 containing the preprogrammed key set that is used for key comparison.

Figure 5:
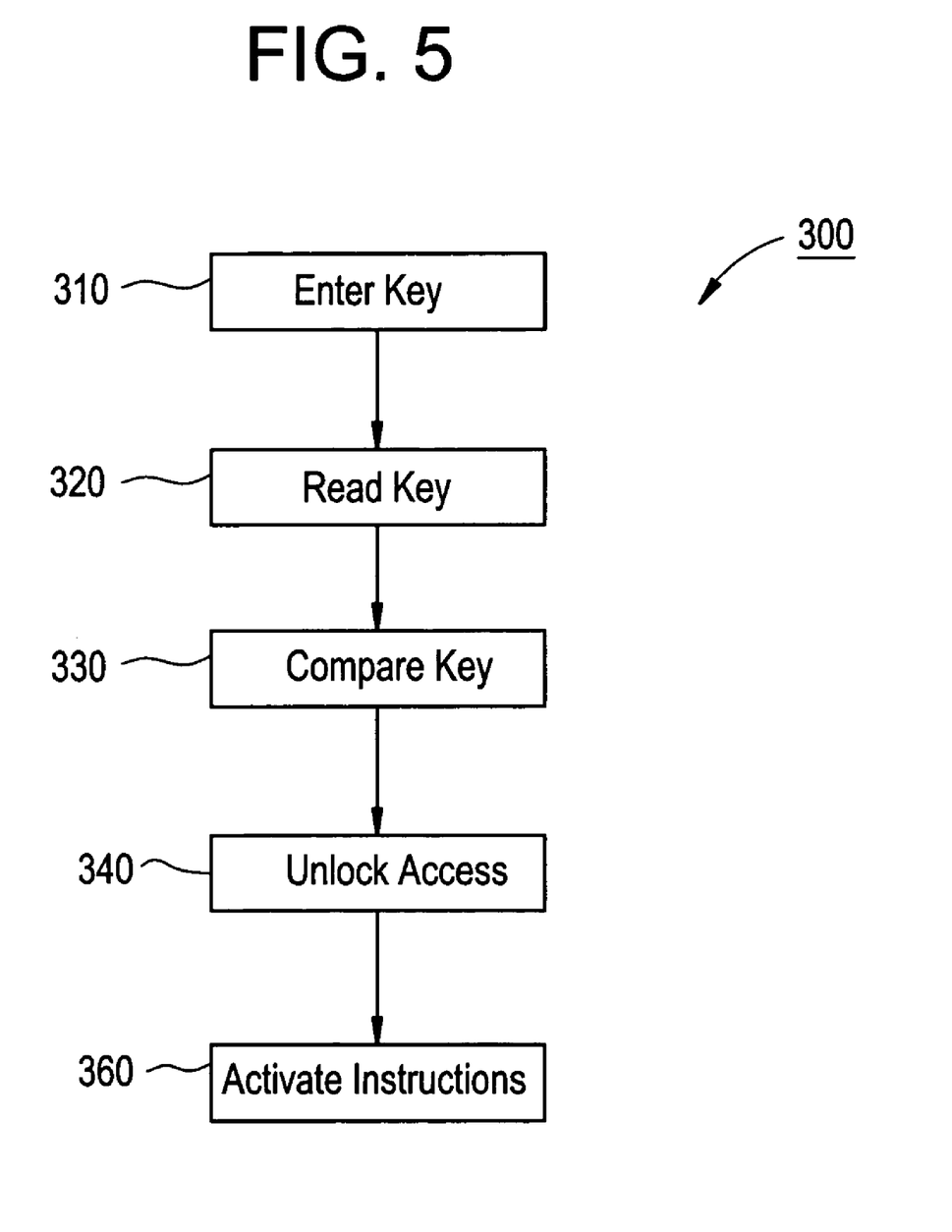
FIG. 5 is a flow chart providing an alternative operation of the module plug and electronic trip unit of FIG. 2.

FIG. 5 depicts a general process 300 for using a lock and key approach for accessing and activating an accessory function 120 of electronic circuit breaker 20. At 310, a key, such as a module plug 60 having an identification register 118 containing an identification number, is inserted into an electronic trip unit 22 of an electronic circuit breaker 20. At 320 and 330, a control program 116 reads the key (module plug 60 having the identification number) and compares it against a set of predefined keys, such as a set of identification numbers preprogrammed into a lookup table 121 in a nonvolatile memory 115 at electronic trip unit 22. At 340, a control program 116 unlocks access to one of the preprogrammed set of instructions 120 only if the inserted key contains an identification number that matches one of the identification numbers of the predefined key set stored at lookup table 121. Each preprogrammed identification number in lookup table 121 correlates to a preprogrammed set of instructions 120 in nonvolatile memory 115 that can be activated to drive an accessory function. At 360, control program 116 instructs microprocessor 110 to activate the appropriate preprogrammed set of instructions 120 to drive the desired accessory function.

Figure 6:
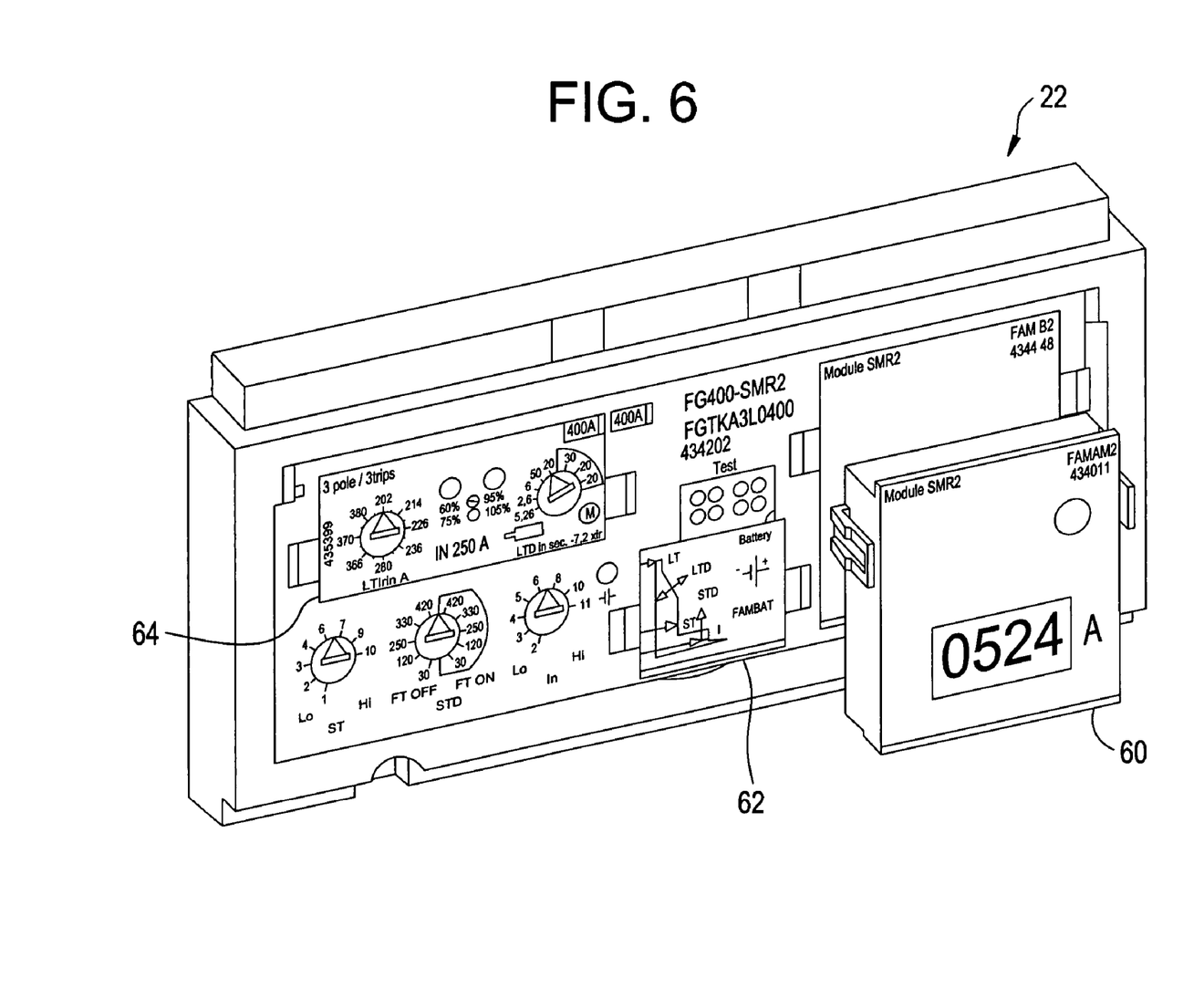
FIG. 6 is an isometric view of the module plug and electronic trip unit of FIG. 2.
Figure 7:
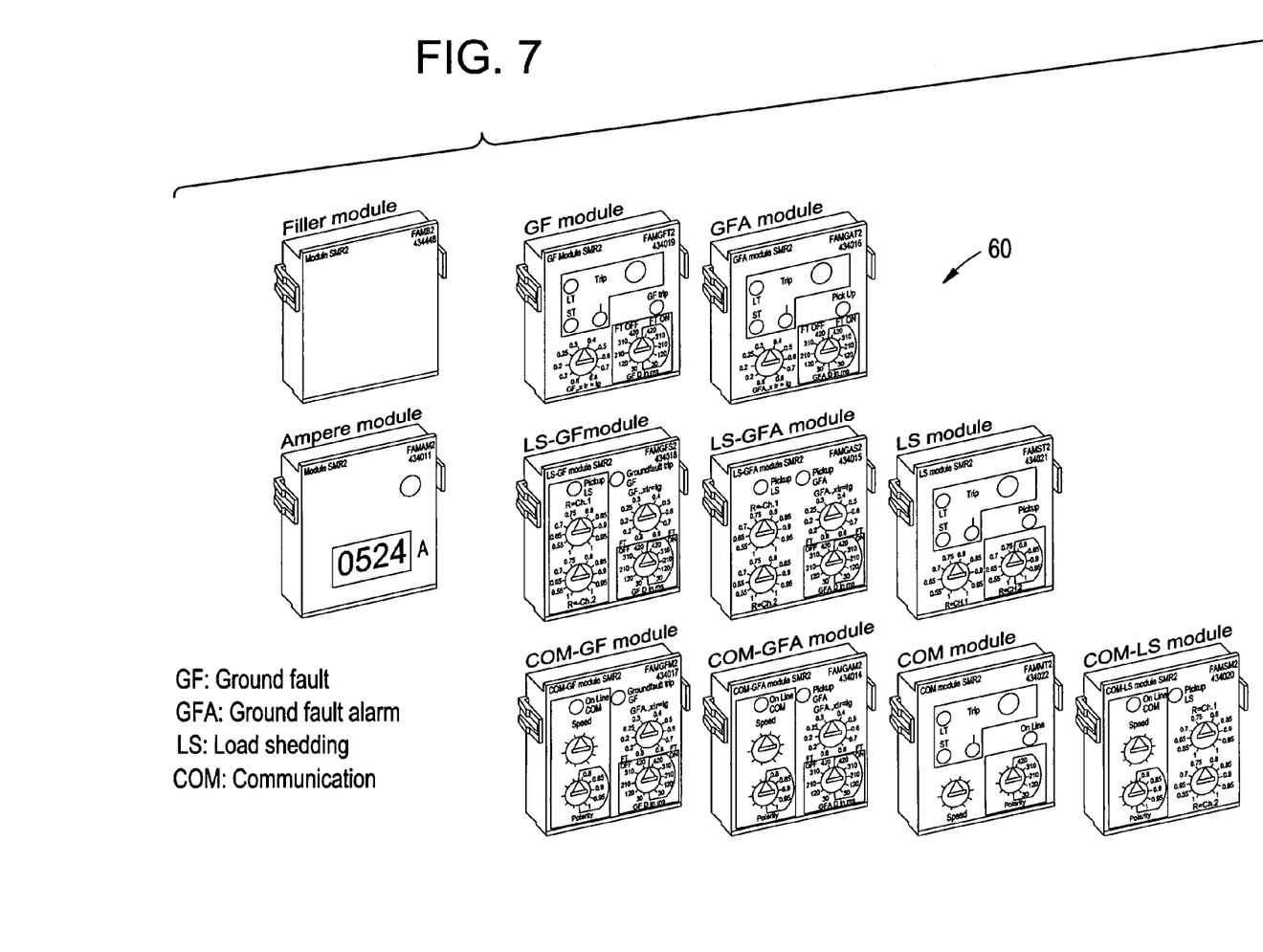
FIG. 7 depicts exemplary module plugs in accordance with embodiments of the invention.

FIG. 6 depicts an exemplary electronic trip unit 22 having a rating plug 64, a plug-in battery (battery module) 62, and a module plug 60. The module plug 60 depicted in FIG. 6 is a display module plug 60 that provides an ammeter display function, however, as discussed above, other module plugs 60 are available and are depicted in FIG. 7. Referring now to FIG. 7, eleven exemplary module plugs 60 are depicted, with ten being functional and one being blank. The ten exemplary functional module plugs 60 provide ammeter display, ground fault, load shedding, and communication functions, as discussed above. The blank module plug 60 either instructs microprocessor 110 to disable access to preprogrammed instructions 120, or provides a null signal to the same effect. It will be appreciated that while eleven exemplary module plugs 60 are depicted, other accessory functions may be accessed and activated as discussed herein without detracting from the scope of the invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electronic trip unit for a circuit breaker comprising:
   a programmed microprocessor;
   a module plug in removable signal communication with the microprocessor, the module plug includes a program identifier;
   wherein the microprocessor recognizes the program identifier and accesses a program of a plurality of programs external to the module plug based on the program identifier;
   wherein the microprocessor responds to the program to perform a function identified by the module plug; and
   wherein the function identifiable by the module plug includes a communications function, a load monitoring function, a non-tripping ground fault alarm function, a flag function, or any combination comprising at least one of the foregoing functions.

2. The electronic trip unit of claim 1, wherein the module plug includes a threshold adjuster and a display.

3. The electronic trip unit of claim 2, wherein the flag function includes a trip target flag function that displays a trip target, a load monitoring flag function that identifies and displays which phase has exceeded a load threshold, a ground fault flag function that displays the existence of a ground fault condition, a communications flag function that displays in response to a communication action occurring with the electronic trip unit, or any combination comprising at least one of the foregoing functions.

4. The electronic trip unit of claim 1, wherein the function identifiable by the module plug includes a communications function, a load monitoring function, a non-tripping ground fault alarm function, a flag function, a blank function, or any combination comprising at least one of the foregoing functions;
   wherein the module plug identifies the blank function to the microprocessor via signal communication, thereby disabling access to the plurality of programs.

5. A method for accessing and activating an accessory function of an electronic circuit breaker, comprising:
   entering a key into an electronic circuit breaker;
   reading the key and comparing the key against a predefined key set;
   unlocking access to a preprogrammed set of instructions for driving an accessory function; and
   activating the preprogrammed set of instructions to drive the accessory function.

6. The method of claim 5, wherein the entering a key further comprises:
   entering a key having an identification number into an electronic trip unit of the electronic circuit breaker, the identification number being stored in an identification register.

7. The method of claim 5, wherein the unlocking access further comprises:
   unlocking access to a preprogrammed set of instructions in response to the entered key matching one of the keys of the predefined key set.

8. The method of claim 7, wherein the unlocking access further comprises:
   unlocking access to a preprogrammed set of instructions in response to the entered key containing an identification number that matches one of the identification numbers of the predefined key set.

9. The method of claim 5, wherein the accessory function includes a communications function, a load monitoring function, a non-tripping ground fault alarm function, a flag function, a blank function, or any combination comprising at least one of the foregoing functions.

10. The method of claim 9, wherein the blank function electronically disables access to the preprogrammed set of instructions for driving an accessory function.

11. An apparatus comprising:
    a trip unit in removable signal communication with a module; and
    a plurality of computer programs each when activated providing predetermined functionality to the trip unit;
    the trip unit configured to receive from the module at least one program identifier associated with at least one of the plurality of programs;
    whereby, receipt of the at least one program identifier by the trip unit initiates the activation of the associated one of the plurality of programs, thereby providing predetermined functionality to the trip unit.

12. The apparatus of claim 11, further comprising a processor that executes activated ones of the plurality of programs.

13. The apparatus of claim 12, further wherein the trip unit comprises a port for receiving the module.

14. The apparatus of claim 13, wherein the plurality of programs includes a communications program, a load monitoring program, a non-tripping ground fault alarm program, a flag program, or any combination comprising at least one of the foregoing programs.

15. An apparatus comprising:
    an electronic module adapted for removable signal communication with an electronic trip unit;
    the module having at least one program identifier associated with at least one of a plurality of programs at the trip unit;
    the module adapted for communicating the at least one program identifier to the trip unit, the at least one program identifier operable to activate the at least one of a plurality of programs, the plurality of programs each when activated providing predetermined functionality to the trip unit;

whereby, receipt of the at least one program identifier by the trip unit initiates the activation of the associated one of the plurality of programs, thereby providing predetermined functionality to the trip unit.

16. The apparatus of claim 15, wherein the module includes a port for communicating a signal to the trip unit.

17. The apparatus of claim 15, wherein the at least one program identifier is operable to activate a communications program, a load monitoring program, a non-tripping ground fault alarm program, a flag program, or any combination thereof, at the trip unit.

18. The apparatus of claim 15, wherein the at least one program identifier is operable to activate a program having a function selected from the group consisting of: a specific function and a blank function.

19. The apparatus of claim 15, wherein the module is absent any preprogrammed instructions.

20. The apparatus of claim 18, wherein the program identifier is operable to provide a null signal to the trip unit thereby disabling access to the plurality of programs.

* * * * *